United States Patent [19]

Lovell

[11] E Patent Number: Re. 32,736

[45] Reissued Date of Patent: Aug. 23, 1988

[54] ALIGNMENT SYSTEM FOR VEHICLE LOAD BED

[76] Inventor: Patrick A. Lovell, 245 S. Heber St., Beckley, W. Va. 25801

[21] Appl. No.: 6,444

[22] Filed: Jan. 23, 1987

Related U.S. Patent Documents

Reissue of:

[64] Patent No.: 4,568,094
Issued: Feb. 4, 1986
Appl. No.: 602,545
Filed: Apr. 20, 1984

[51] Int. Cl.[4] ..... B60G 17/00; B62D 33/08

[52] U.S. Cl. ..... 280/6 R; 280/6 H; 280/414.5; 280/688; 280/702; 280/789; 280/43.23; 180/41

[58] Field of Search ..... 280/414.5, 43.18, 104, 280/43.11, 6 R, 702, 789, 6 H, 683, 688, 678, 43.23; 180/41, 282

[56] References Cited

U.S. PATENT DOCUMENTS

| | | | |
|---|---|---|---|
| 1,009,269 | 11/1911 | Van Sickle | 280/414.5 |
| 2,381,425 | 8/1945 | Deal et al. | 280/678 |
| 2,452,267 | 10/1948 | Schramm | 280/414.5 |
| 2,495,449 | 1/1950 | Francis | 280/43.18 |
| 2,540,100 | 2/1951 | Coeur | 280/43.23 |
| 2,560,715 | 7/1951 | Bill | 180/89.1 |
| 2,610,865 | 9/1952 | Cantrell | 280/43.18 |
| 2,665,920 | 1/1954 | White, Jr. | 280/43.18 |
| 2,706,009 | 4/1955 | Schramm | 180/41 |
| 2,754,129 | 7/1956 | Eckroad | 280/43.18 |
| 2,766,050 | 10/1956 | Stone | 280/414.5 |
| 2,774,604 | 12/1956 | Rendel et al. | 280/43.11 |
| 2,774,606 | 12/1956 | Bunweger et al. | 280/414.5 |
| 2,780,475 | 2/1957 | Koerner | 280/414.5 |
| 2,788,908 | 4/1957 | Lynd | 414/476 |
| 2,806,710 | 9/1957 | Mascaro | 280/414.5 |
| 2,835,400 | 5/1958 | Latzke | 280/43.18 |
| 2,905,481 | 9/1959 | Schramm | 280/43.18 |
| 2,937,775 | 5/1960 | Funk, Jr. | 280/43.18 |
| 2,940,768 | 6/1960 | Thompson et al. | 280/43.18 |
| 2,969,989 | 1/1961 | Struthers | 280/43.11 |
| 2,974,972 | 3/1961 | Hassell | 280/43.23 |
| 2,986,403 | 5/1961 | Ziccardi | 280/104 |
| 3,001,796 | 9/1961 | Martin | 280/43.18 |
| 3,051,504 | 8/1962 | Bruvold | 280/43.18 |
| 3,056,610 | 10/1962 | Massey | 280/43.18 |
| 3,088,531 | 5/1963 | Garrett et al. | 280/6 R |
| 3,096,995 | 7/1963 | Richnow, Jr. | 180/24.02 |
| 3,175,841 | 3/1965 | Smith | 280/683 |
| 3,203,735 | 8/1965 | Vestin | 280/6 H |
| 3,240,008 | 3/1966 | McMullen | 280/43.23 |
| 3,361,440 | 1/1968 | Green | 280/43.18 |
| 3,386,747 | 6/1968 | Watts, Jr. | 280/6 R |
| 3,427,041 | 2/1969 | Nichols | 280/43.18 |
| 3,672,701 | 6/1972 | Blank | 280/414.5 |
| 3,730,044 | 7/1973 | Scheele | 280/6 H |
| 3,765,692 | 10/1973 | Barber et al. | 280/6 R |
| 3,771,617 | 11/1973 | Hornung | 280/702 |
| 3,856,319 | 12/1974 | Hardy | 280/789 |
| 3,917,307 | 11/1975 | Shoebridge | 280/104 |
| 3,924,704 | 12/1975 | Lindblom | 180/41 |
| 3,934,740 | 1/1976 | Rumell | 280/43.23 |
| 3,970,327 | 7/1976 | Dezelan | 280/683 |
| 4,036,528 | 7/1977 | Langendorf | 280/702 |
| 4,174,854 | 11/1979 | Spicka et al. | 280/702 |
| 4,230,341 | 10/1980 | Hart et al. | 280/702 |
| 4,261,616 | 4/1981 | Beegle | 180/282 |
| 4,326,594 | 4/1982 | Oka et al. | 280/414.5 |
| 4,375,903 | 3/1983 | Lovell | 298/175 |
| 4,487,267 | 12/1984 | Friggstad | 280/43.23 |
| 4,602,800 | 7/1986 | Persson | 280/6 H |

*Primary Examiner*—Richard A. Bertsch

[57] ABSTRACT

An elevating system for a vehicle load bed including a vehicle suspension system incorporating a *suspension* support assembly pivotally mounted at one end to the load bed and releasably mounted at the second end *thereof.* Selective release of the [secured] *second* end allows pivotal separation of the load bed and suspension system [and] *resulting in* a corresponding elevation of the load bed. Jacks interposed between the load bed and the suspension system control the pivotal separation. *The elevating system is adapted to be installed on a conventional vehicle load bed and suspension system either during assembly of the vehicle or as an after market addition.*

18 Claims, 6 Drawing Sheets

ALIGNMENT SYSTEM FOR VEHICLE LOAD BED

Matter enclosed in heavy brackets [ ] appears in the original patent but forms no part of this reissue specification; matter printed in italics indicates the additions made by reissue.

BACKGROUND OF THE INVENTION

The movement of goods by road vehicles, more particularly trucks, tractor trailers, and the like, entails both the loading and unloading of the vehicles under a variety of circumstances. Ideally, the vehicle will be backed to position the load bed immediately adjacent and at a common level with a loading dock for a quick transfer of the load either to or from the vehicle load bed, using such equipment as may be considered necessary, including forklifts, hand trucks, etc.

However, it is infrequent that the ideal coplanar relationship between a vehicle load bed and a loading dock is achieved. This is the case for any number of reasons including rutted, unlevel or uneven dock areas upon which the vehicle must be positioned, variations in loading dock heights, the use of high volume trailers with floor heights much lower than existing loading docks, and the use of lightweight, low profile tires. Such tires, recently introduced as an economy measure, tend to position the truck load beds or floors below the conventionally encountered loading docks.

Various means have been proposed to overcome level differentials between the load bed and the dock, including the use of makeshift ramps using loose wood planking or the like as may be available, or more elaborate systems wherein jacks are extended between the rear of the vehicle and the ground with the level of the vehicle adjusted or brought into alignment with the dock by a physical upward jacking or elevating of the entire vehicle. Neither of these proposals have been found particularly desirable. The ramp, depending upon the height differential, may itself be unsafe and difficult to negotiate. Similarly, the ramp may be incapable of accommodating the weight of the goods moving thereover. It would also be necessary that the ramp accommodate variations in height differentials as will be encountered between different trucks and loading docks.

The use of vehicle elevating jacks has the advantages of a wide range of adjustability for direct alignment of the load bed with the floor of the dock and direct transfer of goods therebetween, providing in effect a continuous floor area over which lift trucks, hand trucks and personnel can easily move. However, the use of such jacks, which normally raise the entire end of the vehicle and constitute the only ground engaging supports, introduces a dangerous degree of instability based upon a variety of factors including the weight of the vehicle, the weight of the goods being moved, reaction to movement of the load handling equipment repeatedly off and on the vehicle, and the condition of the jack supporting ground surface. *In addition, extension of the jacks renders the vehicle immobile making it impossible to raise the vehicle prior to backing up to the loading dock thereby facilitating proper alignment of the load bed with the dock. Moreover, with the increased use of independent rail units to transport the trailer beds without the aid of a flatbed rail car, movement of the vehicle upon elevation of the load bed to engage the rail unit is necessary.*

SUMMARY OF THE INVENTION

The present invention proposes a system for effectively aligning the load bed of a vehicle with a loading dock regardless of differences in height or dock area conditions. *In addition, the elevation system allows mounting of the vehicle load bed to independent rail units for transport as part of an intermodal integral train system.* The system of the invention also proposes a highly stable support of the vehicle throughout its range of adjustment with at least a portion of the vehicle supporting wheel assembly remaining in engagement with the ground and constituting the vehicle supporting means with a degree of stability approaching that of the vehicle prior to elevation.

Basically, the invention proposes modification of a *conventional* vehicle suspension system whereby the suspension system, including the wheel assembly, is partially disengaged from the vehicle *main frame* and the vehicle elevated relative to the disengaged portion of the suspension system *or subframe* through appropriate interposed jack means. This in turn results in a retention of the suspension system, and more particularly at least a portion of the wheel assembly, in highly stable, *yet movable,* supporting engagement with the ground while the load bed of the vehicle is upwardly adjusted relative thereto. *The elevating system of the present invention can be added to a conventional vehicle load frame and suspension subframe either during construction of the vehicle or as an after-market product to existing load vehicles.*

More particularly, a standard suspension system will include an elongated support *subframe* from which depends the wheel assembly and which is in turn mounted to the [frame] *main frame of the truck.* In those instances wherein the suspension system is in the nature of a wheel support truck, the elongate support *subframe* will comprise the support beams [or subframe] which mount the wheel assemblies and suspension means, whether air bags, leaf springs, etc. The support [frame] *subframe* is normally pinned at the forward and rear thereof to the overlying vehicle frame. The present invention modifies the mounting of the subframe, *either during initial assembly prior to mounting of the suspension system to the load bed or afterwards by disconnecting the suspension system from the load bed,* by providing for pivotal mounting of one end thereof and releasable mounting of the second end in a manner whereby, upon release of the second end of the subframe, the subframe can freely pivot downward about the first end and relative to the overlying vehicle frame. Appropriate power jack means are interposed between the subframe and the vehicle frame, remote from the pivoted one end, with the [activiation] *activation* of the jack means effecting the downward pivoting of the subframe and suspension system. Inasmuch as the wheel assembly of the [suspension system] *subframe* is engaged with the ground, the extension of the jack means will effect an elevation of the truck frame *without disabling the wheels thereby allowing movement of the truck.* It is this elevation of the truck frame which brings the load bed into alignment with the loading dock.

In those instances wherein the suspension system comprises elongated leaf springs pinned at the opposed ends thereof directly to the vehicle frame and centrally mounting a depending wheel assembly, similar modifications are contemplated within the scope of the present invention. Basically, the mounting at one end of the springs will be modified to allow free swinging movement of the springs, which in effect constitute the suspension system supports, upon release of the second end of the springs. The second end of the springs will in turn be provided with releasable mounting means which, when secured, enable functioning of the suspension system in the normal manner, and which, when released, allow for a free swinging of the suspension system relative to the overlying vehicle frame. Appropriate jack means will mount between the vehicle frame and the springs of the suspension system. When elevation of the vehicle relative to the ground engaging wheel assemblies is required, the second end of the springs is disengaged and the jack means extended to achieve the desired vehicle elevation.

In each of the above situations, the wheel assemblies, either in their entirety or through a substantial portion thereof, remain in ground engagement *to provide complete stability.*

It is to be appreciated that the system of the invention is adaptable to substantially any commonly used wheel [assembly] *subframe* suspension system utilizing an elongated support member in the nature of a beam, frame, leaf spring, or the like, either as an original component thereof or as an addition thereto in contemplation of modification of the structure in [accord] *accordance* with the present invention. *Since modern convention transport truck trailers are manufactured with a main trailer frame and a wheel assembly subframe, attachment of the elevation system of the present invention can be readily accomplished either during original assembly of the trailer or to existing trailer and subframe assemblies without substantial modification.*

The [support] *subframe*, and more particularly the end mounts thereof, are modified to provide for pivotal anchoring of one end thereof to an overlying truck frame in conjunction with a releasable locking of the second end thereof to the truck frame in a manner enabling a remote release of this one end for swinging movement of the wheel assembly mounting [substructure] *subframe* relative to the truck *frame*. The system is completed by incorporation of an appropriate power jack means *into the existing modular assemblies of the truck, namely* between the overlying truck frame and the underlying support [of the subassembly] *subframe* and the overlying portion of the truck, and a corresponding elevation of the load bed of the truck with the wheel assembly maintained in positive stabilizing contact with the ground.

Upon a completion of the loading or unloading procedures, the jack means is retracted and the releasable end of the support reengaged, the vehicle being thus conditioned for road travel in the manner of a conventional vehicle.

DESCRIPTION OF PREFERRED EMBODIMENTS

Figure 1:
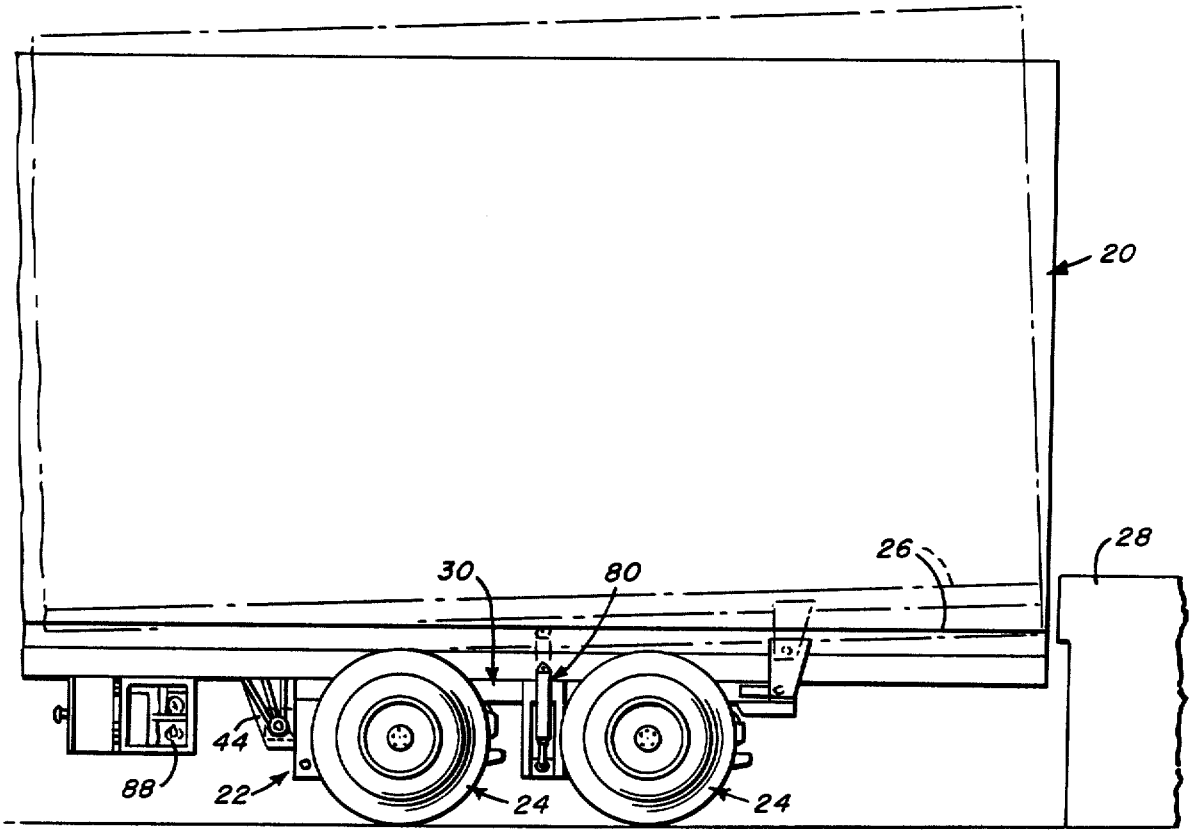
FIG. 1 is a side elevational view of the rear loading end of a vehicle with the load bed adjustment means of the invention incorporated therein.

Referring now more specifically to the drawings, FIG. 1 illustrates the incorporation of the system of the invention into a transport vehicle, in this instance a rear loading trailer 20 including a suspension system in the nature of a support truck 22 mounting tandem wheel assemblies 24. As suggested in the phantom line [showing], the system of the invention operates to *elevate the main frame of the vehicle in order to* bring the load bed 26 of the vehicle 20 into alignment with a loading dock or the like 28, *or to move a rail wheel assembly (not shown) beneath the vehicle 20.*

The alignment system of the present invention is adaptable to substantially any type of *widely utilized* suspension system for trailers and the like *with a minimum of modification* . For purposes of illustration, FIGS. 1-8 illustrate a basic suspension system which may be a permanently positioned wheel assembly support truck or a longitudinally adjustable slider. Such a construction will basically incorporate a support or [support frame] *subframe* 30 which, in the illustrated embodiment, comprises laterally spaced longitudinally extending beams or beam assemblies 32 interconnected by appropriate transversely extending rigidifying beams 34. The [support or support frame] *subframe* 30 mounts the wheel assemblies 24 which may, as illustrated, comprise rocker beams 36 pivoted at one end thereof to brackets 38 depending from the support *beams 32 of the subframe* 30 with air springs or the like 40 engaged between the opposite ends of the rocker beams 36 and the overlying [support 30] *beams 32. The rocker* beams 36, as is conventional, mount the wheel axles which in turn mount the wheels.

Suspension systems of the type described are *found on most modern transport trailers 20 in order to provide the necessary load support. Such systems* are normally attached to [a] *the* vehicle 20 with the [support frame] *subframe* 30 [or], *in particular*, the beam assemblies 32 thereof, mated with a depending *main* frame 42 on the vehicle which, as illustrated, may be in the nature of laterally spaced elongated rails or rail assemblies. The conventional suspension [system] *subframe* positioned below and in supporting engagement with *the main frame of* a trailer or the like will have the [support frame] *subframe* thereof either semi-permanently locked to the vehicle frame [or, when ] *thereby requiring separation thereof prior to installation of the alignment system of the present invention. Alternatively, the present system can be installed during assembly of the subframe to the vehicle main frame. In either case, the existing conventional vehicle assembly is utilized.* When in the nature of a slider, *the subframe is* adjustably engaged therewith for a selective longitudinal shifting as a load balancing means.

The alignment system of the present invention requires a modification of the *existing conventional* suspension system in a manner whereby one end of the support [frame] *subframe* 30, the rear end in the illustrated embodiment, can be completely released from engagement with the vehicle frame 42. The second end of the [support frame] *subframe 30* is pivotally mounted to the vehicle frame whereby relative movement of the suspension system will involve a pivoting of the entire suspension system about the pivotally engaged end of the [support frame] *subframe*. As will be appreciated, this pivotal movement, through engagement of the suspension system with the ground, will actually result in an elevation of the overlying vehicle body, all as suggested in FIG. 7.

Depending upon the particular nature and construction of the suspension system involved, it may be possible to replace the conventional [support frame] *subframe* mounts or attachment means with an appropriate pivot pin assembly at the forward end of the suspension system [frame] *subframe* 30 and with an appropriate releasable pin or latch assembly at the rear of the [support frame] *subframe* 30, thus providing for the desired free pivotal swinging of the suspension system. However, the more likely situation will involve a modification of the mounting arrangement of the suspension system *by eliminating the welding attachment between the existing subframe 30 and the trailer main frame 42*. In the suspension system illustrated, a pair of rigidified brackets 44 are welded or otherwise rigidly affixed to the vehicle frame and depend therefrom immediately forward of the suspension system. Each of the brackets includes a lateral outwardly extending shaft journal 46. One bracket 44 is aligned with each of the rocker beam brackets 38 associated with the suspension system. The bracket 38 in turn has a shaft journal 48 fixed thereto, normally slightly rearwardly thereof between a pair of mounting plates 50 welded to bracket 38. The journals 46 and 48 are aligned and, at opposite sides of the vehicle, receive the opposed end portions of a transversely extending pivot shaft 52. With such a construction, the forward end of the [suspension system] *existing subframe 30* is pivotally mounted to the vehicle frame for relative movement between a first position nested in supporting engagement with the vehicle frame and a second position pivoted vertically therefrom.

At the rear or aft end of the suspension system as illustrated, each of the side beam assemblies 32 of [support frame] *subframe* 30 includes a bracket 54 rigid therewith and projecting rearwardly thereof. The brackets 54 are interconnected by a transverse stabilizer member 56 positioned slightly inward of the outer ends of the brackets 54. Laterally inward of each bracket 54 and welded to and extending between the respective beam assembly 32 and the stabilizer member 56 is an inner wall 58 defining a chamber 60 between each bracket 54 and the associated wall 58. An elongated locking pin 62 extends through each chamber and includes an inner end inward of the associated wall 58 and an outer end projecting outwardly beyond bracket 54. Both the brackets 54 and walls 58 are appropriately apertured to allow passage of the pins 62 therethrough. Each pin is spring loaded toward an outwardly directed position whereby the outer end of the pin is resiliently retained outward of the associated bracket 54. Appropriate spring means 64 will mount within each of the chambers 60.

The outwardly projecting ends of the pins 62, in the upwardly retracted and locked position of the suspension system, are received through apertured lower ends of a pair of locking brackets 66 welded or otherwise rigidly affixed to the vehicle frame 42 and depending therefrom. As will be appreciated from FIG. 6 in particular, the brackets 66 will be formed to accommodate the particular vehicle and suspension system construction with the apertured lower portion of the brackets 66 positioned to lie immediately outward of the bracket 54 with the apertures in alignment for locking extension of the respective locking pins 62 through the aligned apertures.

The inner ends of the locking pins 62 have elongated rigid links 68 pivoted thereto with their respective inner ends pivoted to a short connecting link 70 fixed to a transverse shaft 72. The rotation of shaft 72 is controlled by a projecting crank arm 74. The crank arm 74 is biased in a first rotational direction by a coiled tension spring 76 engaged between the crank arm 74 remote from the rotating shaft 72 and an outward point along the stabilizer member or bar 56. The biased position of the crank arm 74 effects, in conjunction with the pin positioning springs 64, a lateral outward extension of both lock pins 62 for engagement through the aligned apertures in brackets 54 and 66. In this manner the aft end of the suspension system is rigidly locked to the vehicle frame.

Withdrawal of the locking pins 62 is produced by swinging movement of the crank arm 74 against the resilient biasing force of spring 76. This is effected, in the illustrated embodiment, by an elongated control arm 78 having an inner end pivotally engaged with the outer end of the crank arm 74 and an outer handled end projecting beyond one of the side beam assemblies 32 of the suspension system. This control rod 78 is retained in position for free sliding manipulation by engagement through an enlarged aperture in a depending portion of the corresponding pin-receiving bracket 54. The pin release, as described, is broadly similar to that utilized in a slider suspension system to release the subframe or support assembly for sliding adjustment thereof.

While not illustrated in the specific embodiment of FIGS. 1–8, it is contemplated that, as an alternative to the use of a manual release for the lock pins, appropriate power means, such as a solenoid operator or a fluid ram, be used as a portion of an overall system wherein alignment control can be effected from a single control station, either in or near the cab of the vehicle.

Actual pivotal adjustment *of the subframe 30* of the suspension system upon release of the locking pins, which basically translates into an elevation of the vehicle, is achieved through the use of a pair of power jacks 80, preferably hydraulic rams. These jacks 80 are located immediately to each side of the vehicle and underlying [suspension system] *subframe* remote from the pivot shaft mounting thereof and preferably intermediate the forward and aft ends of the [support frame] *subframe* 30.

Each jack 80 has the upper end 82 thereof, the outer end of the cylinder, pivotally mounted to the *existing* vehicle frame 42. The lower end of the jack 80, the outer end of the piston 84, is in turn pivotally mounted to a rigid bracket 86 welded or otherwise rigidly affixed to the [support frame] *subframe* 30 and, assuming a position between the wheel sets of a tandem wheel assembly, also to one of the support brackets 38. The bracket 86 will normally include a box-like lower portion for generally confining and protecting the piston rod 84 while allowing for free pivotal movement of the jack 80 during the full range of operation.

Figure 7:
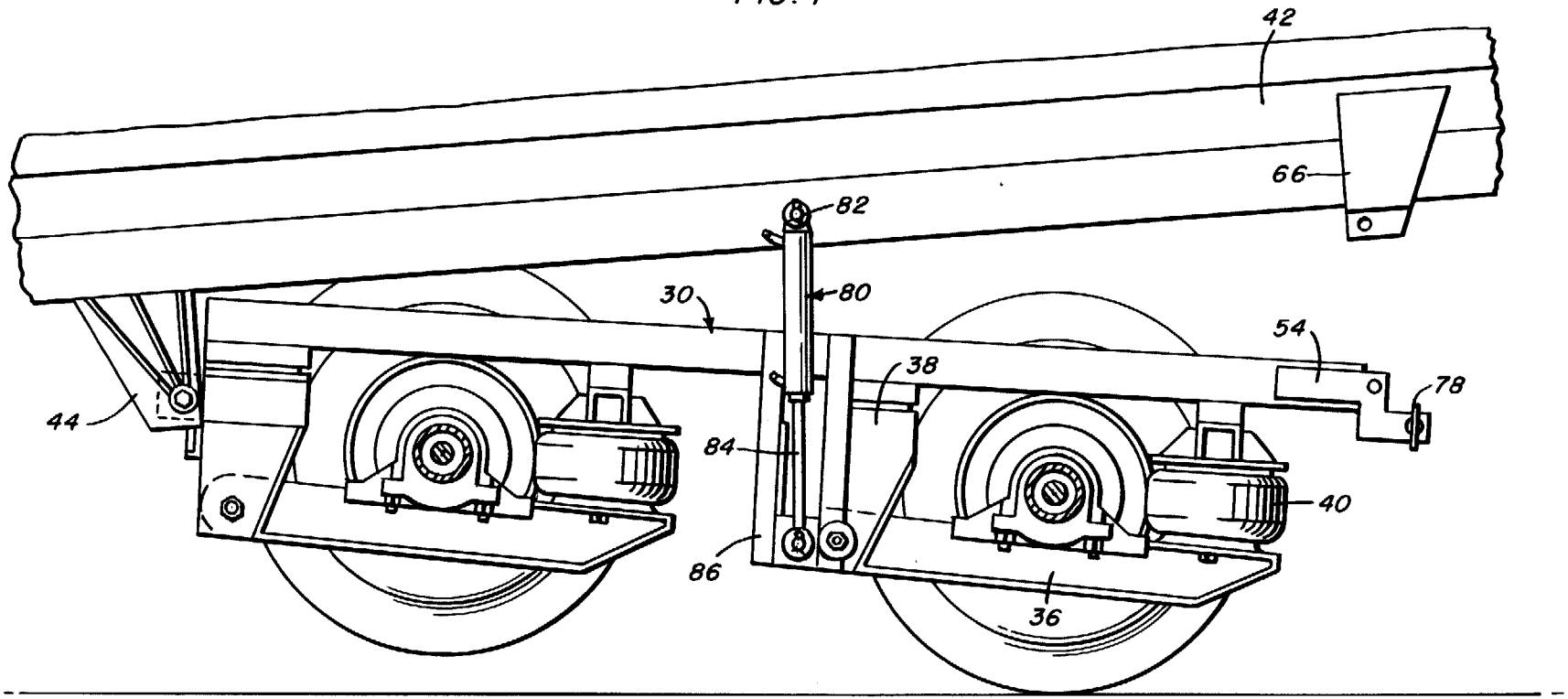
FIG. 7 is a side elevational view similar to FIG. 3 with the apparatus of the invention in use and the vehicle elevated.

In use, after backing the vehicle 20 to position the loading end adjacent a loading dock 28, if it should be necessary to elevate the vehicle load bed 26, the locking pins 62 are withdrawn and the jacks 80 are extended. *Alternatively, with loading docks 28 of known height and to reduce loading and unloading time, the jacks 80 may be extended prior to backing the vehicle 20 into the loading bay since the suspension system is fully operable even with the jacks 80 extended.* Noting FIG. 7 in particular, in a tandem wheel suspension system the extension of the jacks 80 will result in pivoting of the vehicle body about a forward support (not illustrated). At the same time, the [suspension system] *subframe* itself will pivot relative to the vehicle body with the rear set of wheels remaining in positive stabilized engagement with the ground while the forward set of wheels elevates slightly. Thus, the vehicle at all times is wheel supported on the ground, retaining full stability and full utilization of the braking system and the suspension system as the load supporting means. Once the loading or unloading operation is completed, the jacks 80 are retracted, the locking pins reinserted, and the vehicle *frame 42 again is supported on the subframe 30 as with conventional vehicles such that the vehicle is* thereby immediately conditioned for road travel.

Figure 8:
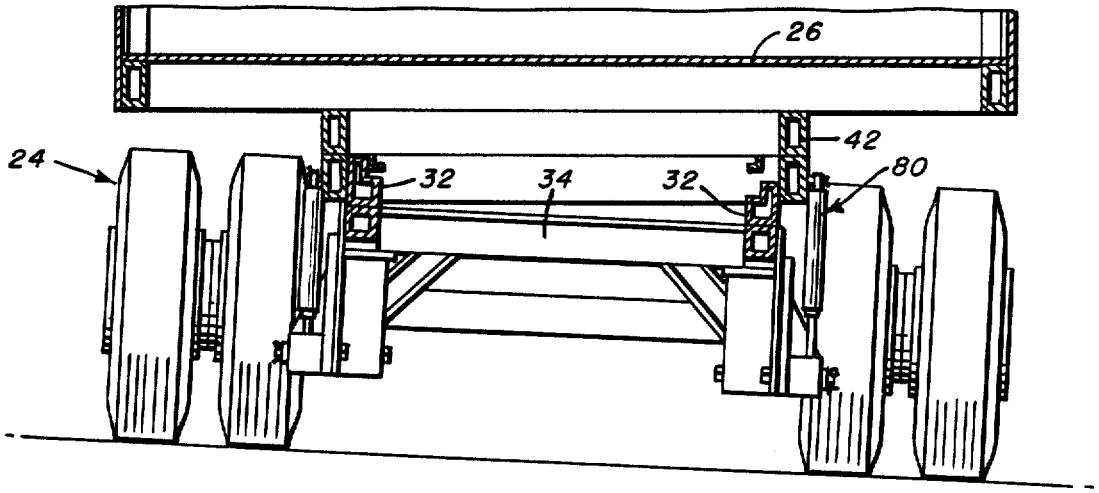
FIG. 8 is a transverse detail through the vehicle of FIG. 1 illustrating a lateral leveling of the vehicle.
Figure 2:
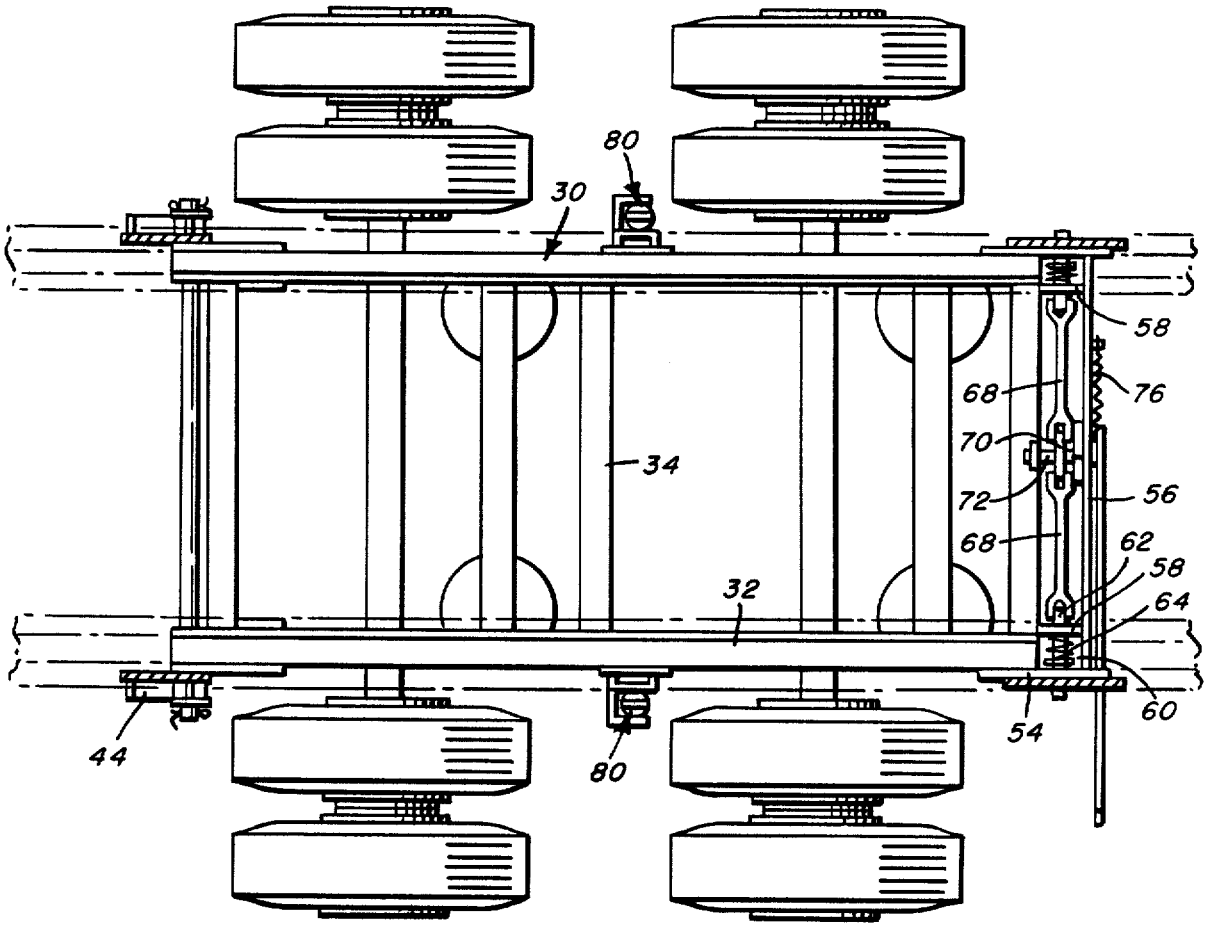
FIG. 2 is a plan view of the suspension [system] *subframe* of the vehicle of FIG. 1 with the apparatus of the invention incorporated therein.
Figure 6:
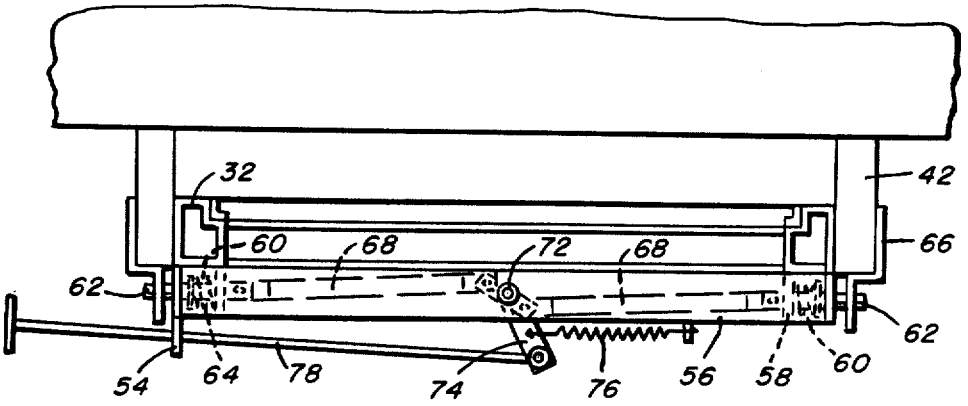
FIG. 6 is a cross-sectional detail taken substantially on a plane passing along line 6—6 in FIG. 3.
Figure 3:
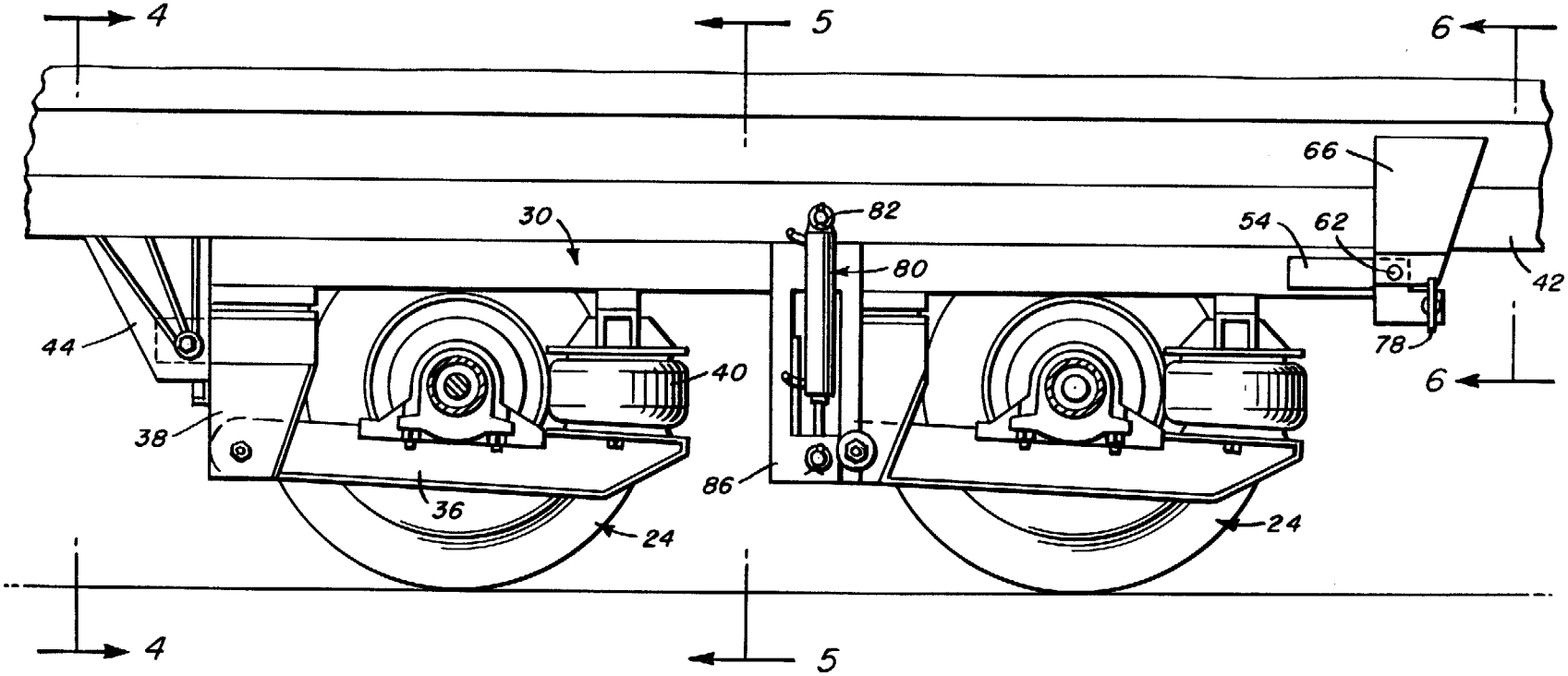
FIG. 3 is an enlarged side elevational detail of the suspension system of [claim] *FIG.* 1 with the near wheels removed.
Figure 4:
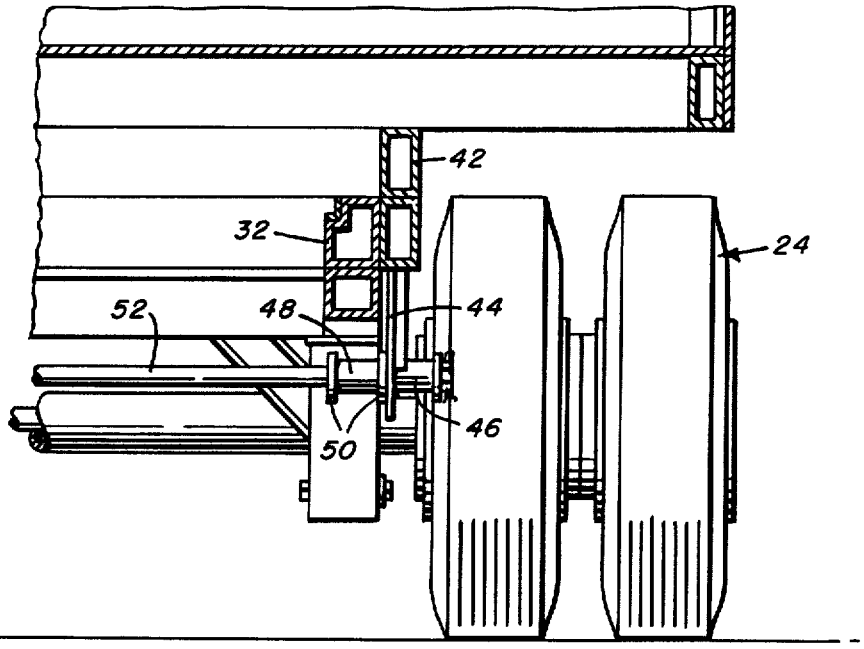
FIG. 4 is a cross-sectional detail taken substantially on a plane passing along line 4—4 in FIG. 3.
Figure 5:
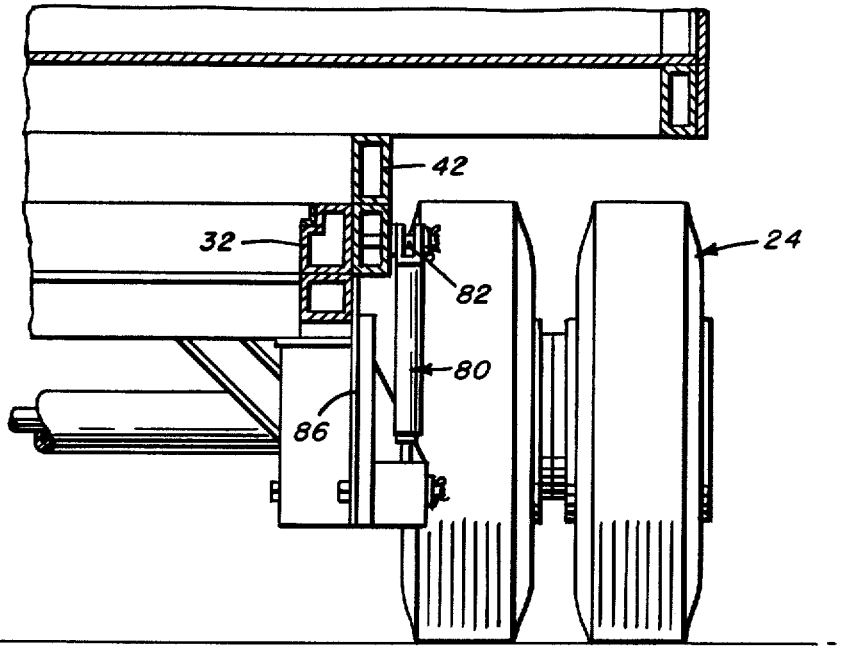
FIG. 5 is a cross-sectional detail taken substantially on a plane passing along line 5—5 in FIG. 3.

Noting FIG. 8, in those instances wherein a degree of lateral leveling of the load bed is desired, the opposed jacks 80 can be selectively extended, one more than the other, to a limited degree. To do so will of course require an appropriate universal mounting of the upper and lower ends of the jacks as well as an inherent capability, normally within the support framework of the suspension system, to enable a degree of flexing thereof.

While no particular control system has been illustrated for operation of the components of the alignment system of the invention, including the manipulation of the lock pins and the activation of the jacks, the present invention contemplates the use of any appropriate means including air, hydraulics, or electric, or any combination thereof. In conjunction therewith, the actual control system will in all probability be determined by the power systems available on the vehicle itself. For example, in a vehicle incorporating a suspension system including air bags, the air system can also be modified to control the selective retraction of the locking pins while the jacks are incorporated into the conventionally present hydraulic system for selective activation thereof. An appropriate control panel or station has been illustrated at 88 in FIG. 1.

In a typical installation including air bag suspension, the driver [will] *may* back the vehicle to the dock and set the vehicle park valve. The lock pins will then be released. While this may be done manually, use of an available air system, modified to control pin movement, is preferred. In such case, the driver need only pull a master control switch with pilot operated relays operating to retract the lock pins, dump air from the air bag suspension, and set the vehicle brakes to prevent movement of the vehicle away from the dock. The park valve can then be released, after which the jacks are activated and the load bed elevated. Release of air from the air bag suspension is desirable *where absolute stability is required* in that with the suspension resting on the internal stop blocks of the deflated springs, an additional degree of stability is obtained. As a modification, air can be released from the air bag suspension as the load bed is being elevated.

The system, as above detailed, calls for release of the aft end of the support [frame] *subframe* 30 of the suspension system for pivoting thereof about the forward end. If considered appropriate, due to the nature of the vehicle, or particular anticipated conditions at the normally encountered dock areas, the mounting of the suspension system, pursuant to the invention, can provide for pivotal securement of the aft end of the suspension system with a releasable locking of the front end thereof. Operation of the intermediate jacks will, in an obvious manner, equally effectively produce an elevating alignment of the rear of the vehicle load bed. Finally, it is also contemplated that the forward and aft mounting of the suspension system, or more particularly the [support frame] *subframe* thereof, can in each instance be releasable, incorporating retractable locking pins. In such case, release of one set of locking pins will be effected while the second set constitutes pivot means for the suspension system. In this manner, the operator of the vehicle, depending upon encountered conditions, for example poor ground conditions immediately adjacent the dock, can selectively maintain either wheel assembly of a tandem wheel suspension system in stabilizing engagement with the ground during the lifting operation.

Figure 9:
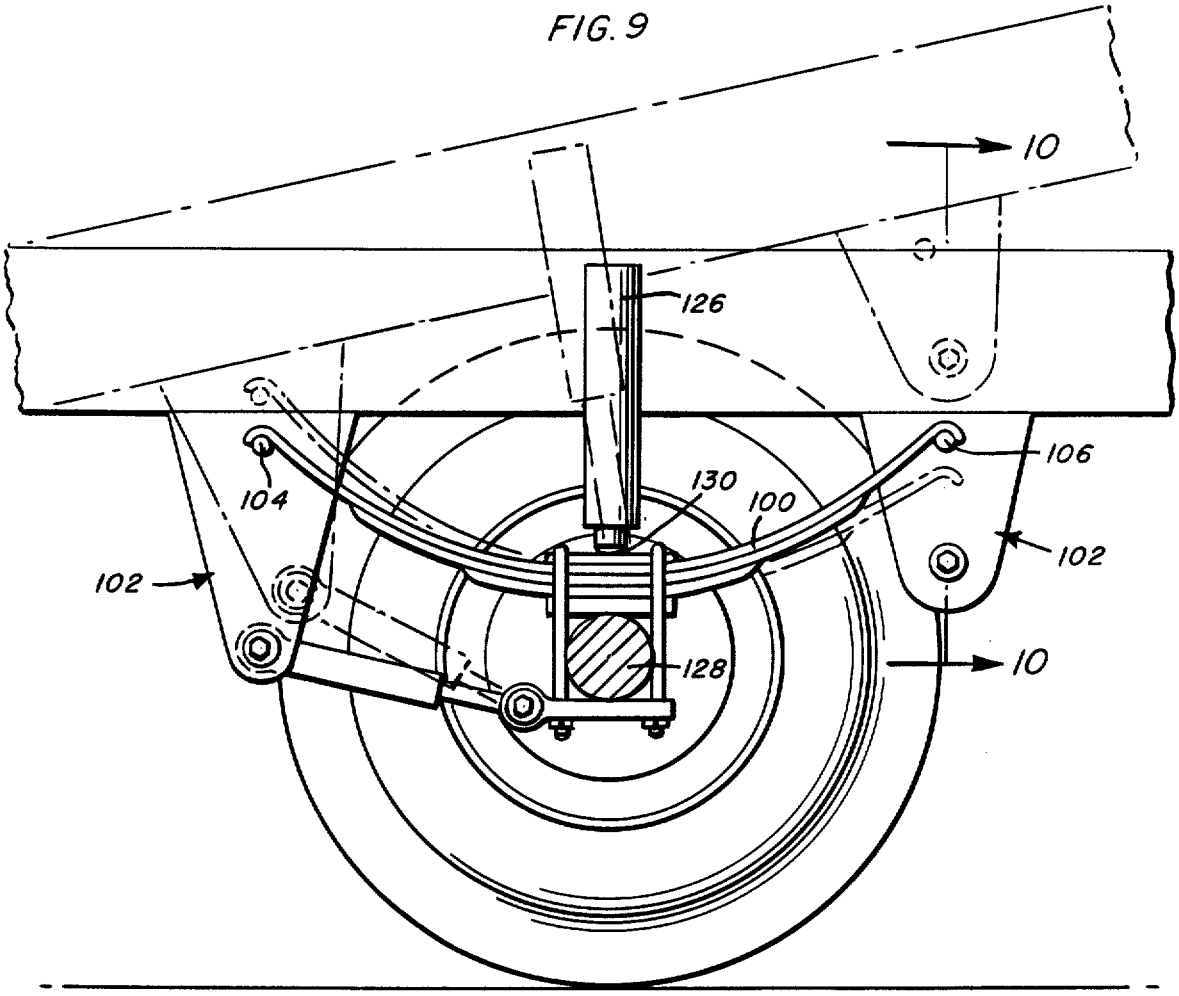
FIG. 9 illustrates the system of the invention incorporated into a leaf spring suspension system.
Figure 10:
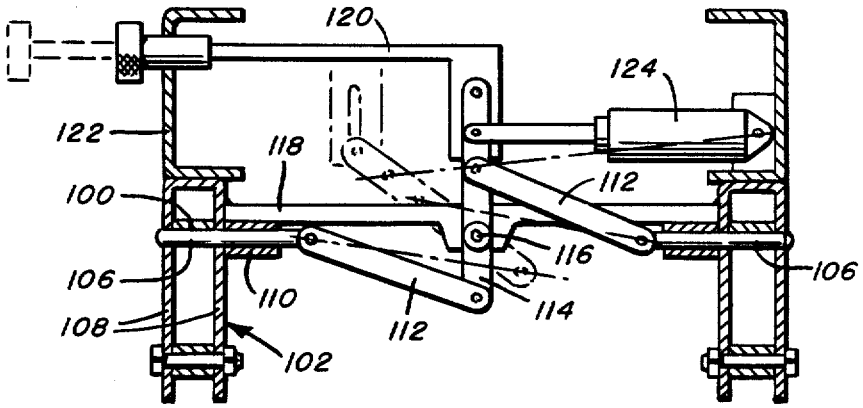
FIG. 10 is a detailed view taken substantially on a plane passing along line 10—10 in FIG. 9.

Attention is now directed to FIGS. 9 and 10 wherein the system of the invention is presented in conjunction with a leaf spring stack suspension system incorporating a conventional leaf spring 100 as both the spring means and main support or support frame. The spring *as the opposite ends engage lower surfaces that are on the load bed structure* 100 conventionally has the opposed end thereof mounted on hangers 102 either pivotally or slidably, or a combination thereof, to accommodate flexure of the spring.

The alignment system of the present invention proposes a modification of the spring suspension system in a manner whereby one end mount 104 thereof provides a pivotal attachment for the corresponding end of the spring 100. The second end mount is capable of selectively completely releasing the associated spring end, allowing for the desired pivotal movement. As one example, noting FIG. 10, the releasable mount can comprise a pair of withdrawable lock pins 106, each associated with one of a pair of laterally spaced springs 100 associated with the wheels to the opposite sides of the vehicle.

Each pin 106 is received through aligned openings in each of the laterally spaced plates 108 of the associated hanger 102 which receives the end of the spring 100 therebetween. The pin will be located in supporting engagement with the spring end, either immediately therebelow as a support or through a journal end provided thereon. If so desired, each pin 106 can be stabilized by an inwardly directed boss or sleeve 110 affixed to the inner panel 108 of the corresponding hanger 102.

The inner ends of the two lock pins 106 are connected by pivot links 112 to a central crank 114 which is in turn pivotally mounted, as at 116, to a rigid crossbar 118. The links 112 are connected to the opposite sides of the pivot 116 whereby pivoting of the crank 114 will result in synchronized withdrawal or projection of the locking pins 106. Actual manipulation of the crank 114 can be effected either manually through an elongated control rod 120 appropriately engaged with one end of the crank and mounted on the overlying vehicle frame 122, or by appropriate power means such as a fluid cylinder 124 pivoted at one end to the vehicle frame 122 and at the second end thereof to the crank 114.

Actual elevation of the vehicle, upon release of one end of the spring suspension system, will be effected by a vertical power jack 126 associated with each support spring, preferably oriented as illustrated in FIG. 9. Basically, the upper or cylinder end of the jack, assuming a fluid cylinder, is mounted to the vehicle frame with the lower or piston end thereof aligned directly over the vehicle axle 128 for selective engagement with an upwardly directed bearing pad 130 overlying the spring. At all times other than during the actual elevation of the vehicle, the jack is preferably completely retracted from engagement with the bearing pad 130 or spring 100 to enable operation of the vehicle suspension system in a conventional manner. At such times as elevation of the vehicle load bed is desired, the locking pins 106 are withdrawn, the jacks extended into engagement with the bearing pads 130, and, through continued extension of the jacks 126, the vehicle elevated. The vehicle elevation will be equally effective whether the forward or aft ends of the springs are released. If so desired, as with the previously described embodiment, it is contemplated to modify a spring suspension system wherein the forward and aft ends thereof can be selectively released with the retained ends pivotally mounted by the locked locking pins.

The foregoing is illustrative of the principles of the invention. Other embodiments and modifications within the scope of the invention and as suggested by the nature of the vehicles to be adapted will occur to those skilled in the art and familiar with the principles of the invention as herein detailed. Accordingly, it is to be appreciated that the invention is not limited to the exact construction and manner of vehicle modification specifically shown and described.

I claim:

1. In a vehicle including a load bed structure having at least one loading end, a ground-engaged wheel suspension system below said loading end, said suspension system [having an elongate] *including a* support *subframe* with opposed end portions mounted to said load bed structure and a wheel assembly mounted between said opposed ends and depending from said support *subframe*; the improvement comprising an alignment system for selectively elevating the [laoding] *loading* end of the load bed structure while at least a portion of the wheel [suspension system] *assembly* is maintained in engagement with the ground, said alignment system comprising pivot means securing one end [portion of said opposed end portions of the elongate support] *of said subframe* to said load bed structure for vertical pivotal movement of the [elongate support] *subframe* and suspension system about said pivot means and relative to said load bed structure, lock means locking a second end [portion of said opposed end portions] *of said subframe* to said load bed structure and fixing said [elongate support] *subframe* and suspension system against pivotal movement relative to said load bed structure about said pivot means, release means for selectively releasing said lock means allowing free vertical swinging of said second end [portion] *of said subframe* about said pivot means and relative to said load bed structure, and jack means mounted between said load bed structure and suspension system remote from said pivot means for effecting a selective pivotal movement of the suspension system, upon release of said lock means, relative to said load bed structure and in a manner effecting a vertical adjustment of the load bed structure.

2. In the construction of claim 1, said [elongate support] *subframe* of said suspension system comprising a pair of laterally spaced elongate support beam assemblies having first ends constituting said one end portion of the [elongate support] *subframe* and second ends constituting said second end portion of the [elongate support] *subframe*; said improvement further comprising a first bracket rigid with said load bed structure adjacent each of said beam assembly first ends, and a companion second bracket rigid with each of said beam assembly first ends and positioned in transverse alignment with the corresponding first bracket, said pivot means comprising aligned shaft journals on the companion first and second brackets associated with each beam assembly first end, and a pivot shaft component within the aligned shaft journals of the companion brackets.

3. In the construction of claim 2, the improvement further comprising cooperating brackets associated with each of the second ends of the support beam assemblies and including a third bracket rigid with said load bed [assembly] *structure* adjacent a second end and a fourth bracket rigid with the adjacent second end and positioned in transverse alignment with the cooperating third bracket, said lock means comprising aligned apertures in the transversely aligned brackets, and a reciprocating lock pin received through the aligned apertures, said release means comprising means engaging said lock pin and effecting a selected withdrawal thereof from the aligned apertures.

4. In the construction of claim 3, the improvement further comprising a jack bracket mounted on each beam assembly, said jack means comprising a jack associated with each beam assembly and including a lower end mounted to the beam assembly jack bracket and an upper end mounted *to* an overlying portion of the load bed structure.

5. In the construction of claim 4, [the] said jack means comprising fluid rams.

[6. In the construction of claim 1, said elongate support comprising a pair of laterally spaced elongate spring assemblies having first ends constituting said one end portion of the elongate support and second ends constituting said second end portion of the elongate support.]

[7. In the construction of claim 6, said jack means comprising a jack associated with each spring assembly, each such jack including an upper end adjustably mounted on said load bed structure and a lower end selectively engageable with the associated spring assembly for a manipulation thereof.]

[8. In the construction of claim 7, the lower end of each jack being selectively withdrawable from engagement with the associated spring assembly to allow unencumbered operation of said spring assembly.]

9. In a vehicle including a load bed structure having a loading end, a ground-engaging wheel suspension system below said loading end, said suspension system having [an elongate support] *a subframe* with opposed ends mounted to said load bed structure and a wheel assembly mounted between said opposed ends and depending from said [support] *subframe*; a method of modifying the vehicle to enable a selective elevation of the load bed structure, adjacent the loading end, relative to the suspension system *subframe* while maintaining the suspension system in vehicle supporting ground engagement, said method comprising the steps of providing a pivotal mount at one end of the [elongate support] *subframe* between the [elongate support] *subframe* and the load bed structure, providing a releasable mount of the second end of the [elongate support] *subframe* between the [elongate support] *subframe* and the load bed structure, said releasable mount selectively fixing the second end to the load bed structure and selectively releasing said second end of the [elongate support] *subframe* from the load bed structure to permit relative pivotal movement of the suspension system about the pivotal mount of the first end of the [elongate support] *subframe*, and providing selectively extendable means between the [elongate support] *subframe* and the load bed structure for effecting a relative pivotal movement between the [elongate support] *subframe* and the load bed structure subsequent to release of the locking mounts at the second end of the [elongate support] *subframe*, said relative pivotal movement effecting a vertical adjustment of the load bed structure relative to the ground for alignment with loading docks and the like.

[10. In a vehicle comprising a vehicle load bed and a wheeled suspension system, a method of aligning the vehicle load bed with a loading dock, said method comprising the steps of disconnecting a portion of the wheeled suspension system for interconnected movement of the suspension system and vehicle bed relative to each other, vertically adjusting the vehicle load bed and suspension system relative to each other and aligning the load bed with the loading deck in a substantially coplanar relationship, and maintaining at least a portion of the suspension system wheels in ground engagement throughout the relative adjustment.]

*11. In a conventional load transporting vehicle including a load bed structure having at least one loading end, and a ground engaging wheel suspension system having a subframe underlying the vehicle load bed structure and a wheel assembly depending from the subframe, an alignment system for selectively elevating the loading end of the load bed structure while at least a portion of the wheel assembly is maintained in engagement with the ground, said alignment system comprising:*

*pivot means pivotably securing one end of the subframe to the load bed structure for vertical pivotal movement of the subframe and suspension system about said pivot means relative to the load bed structure;*

*lock means locking a second end of the subframe to the load bed structure and fixing the subframe and suspension system against pivotal movement relative to the load bed structure about said pivot means;*

*release means for selectively releasing said lock means allowing free vertical swinging of said second end of the subframe about said pivot means and relative to the load bed structure; and*

*jack means mounted between the load bed structure and the subframe remote from said pivot means for effecting a selective pivotal movement of the suspension system, upon release of said lock means, relative to the load bed structure and in a manner effecting a vertical adjustment of the load bed structure.*

*12. The alignment system as defined in claim 11 wherein the vehicle is a trailer and the load bed structure comprises a substantially planar load bed having a mainframe structure, the mainframe structure of the load bed abuttingly overlying the subframe of the wheel suspension system whereby said pivot means, said lock means, said release means, and said jack means are mounted between the subframe and the load bed structure.*

*13. The alignment system as defined in claim 12 wherein said jack means comprises at least one jack having an upper end mounted to the existing mainframe of the load bed structure and a lower end mounted to the existing subframe of the wheel suspension system.*

*14. The alignment system as defined in claim 12 wherein the subframe comprises a pair of laterally spaced elongaged support beam assemblies having first ends constituting said one end portion of the subframe and second ends constituting said second end portion of the subframe and further comprising a first bracket rigid with the load bed structure adjacent each of said beam assembly first ends and a companion second bracket rigid with each of said beam assembly first ends positioned in transverse alignment with said corresponding first bracket.*

*15. The alignment system as defined in claim 14 wherein said pivot means comprises aligned shaft journals on said companion first and second brackets associated with each of said beam assembly first ends, and a pivot shaft component within said aligned shaft journals of said companion brackets.*

*16. The alignment system as defined in claim 14 and further comprising a third bracket rigid with the load bed structure adjacent said second end of said beam assemblies and a companion fourth bracket rigid with said second end of said beam assemblies positioned in transverse alignment with said companion third bracket, said lock means comprising aligned apertures in said transversely aligned brackets and a reciprocating lock pin received through said aligned apertures, said release means comprising means engaging said lock pin and effecting a selected withdrawal thereof from said aligned apertures.*

*17. The alignment system as defined in claim 16 wherein said first bracket and said third bracket are rigidly secured to the existing mainframe structure of the load bed structure.*

*18. The alignment system as defined in claim 16 wherein said second bracket and said fourth bracket are rigidly secured to the existing subframe of the wheel suspension system.*

*19. In a vehicle including a load bed structure having at least one loading end, a ground-engaged wheel suspension system below said loading end, said suspension system having an elongate support with opposed end portions mounted to said load bed structure and a wheel assembly mounted between said opposed ends and depending from said support; the improvement comprising an alignment system for selectively elevating the loading end of the load bed structure while at least a portion of the wheel suspension system is maintained in engagement with the ground, said alignment system comprising pivot means securing one end portion of said opposed end portions of the elongate support to said load bed structure for vertical pivotal movement of the elongate support and suspension system about said pivot means and relative to said load bed structure, lock means locking a second end portion of said opposed end portions to said load bed structure and fixing said elongate support and suspension system against pivotal movement relative to said load bed structure about said pivot means, release means for selectively releasing said lock means allowing free vertical swinging of said second end portion about said pivot means and relative to said load bed structure, and jack means mounted between said load bed structure and suspension system remote from said pivot means for effecting a selective pivotal movement of the*

*suspension system, upon release of said lock means, relative to said load bed structure and in a manner effecting a vertical adjustment of the load bed structure; said elongate support of said suspension comprising a pair of laterally spaced elongate support beam assemblies having first ends constituting said one end portion of the elongate support and second ends constituting said second end portion of the elongate support; said improvement further comprising a first bracket rigid with said load bed structure adjacent each of said beam assembly first ends, and a companion second bracket rigid with each of said beam assembly first ends and positioned in transverse alignment with the corresponding first bracket, said pivot means aligned shaft journals on the companion first and second brackets associated with each beam assembly first end, and a pivot shaft component within the aligned shaft journals of the companion brackets; cooperating brackets associated with each of the second ends of the support beam assemblies and including a third bracket rigid with said load bed structure adjacent a second end and a fourth bracket rigid with the adjacent second end and positioned in transverse alignment with the cooperation third bracket, said lock means comprising aligned apertures in the transversely aligned brackets, and a reciprocating lock pin received through said aligned apertures, said release means comprising means engaging said lock pin and effecting a selected withdrawal therefor from the aligned apertures.*

*20. In a vehicle including a load bed structure having at least one loading end, a ground-engaged wheel suspension system below said loading end, said suspension system having an elongate support with opposed end portions mounted to said load bed structure and a wheel assembly mounted between said opposed ends and depending from said support; the improvement comprising an alignment system for selectively elevating the loading end of the load bed structure while at least a portion of the wheel suspension system is maintained in engagement with the ground, said alignment system comprising pivot means securing one end portion of said opposed end portions of the elongate support to said load bed structure for vertical pivotal movement of the elongate support and suspension system about said pivot means and relative to said load bed structure, lock means locking a second end portion of said opposed end portions to said load bed structure and fixing said elongate support and suspension system against pivotal movement relative to said load bed structure about said pivot means, release means for selectively releasing said lock means allowing free vertical swinging of said second end portion about said pivot means and relative to said load bed structure, and jack means mounted between said load bed structure and suspension system remote from said pivot means for effecting a selective pivotal movement of the suspension system, upon release of said lock means, relative to said load bed structure and in a manner effecting a vertical adjustment of the load bed structure; said elongate support comprising a pair of laterally spaced elongate spring assemblies having first ends constituting said one end portion of the elongate support and second ends constituting said second end portion of the elongate support; said jack means comprising a jack associated with each spring assembly, each such jack including an upper end adjustably mounted on said load bed structure and a lower end selectively engageable with the associated spring assembly for a manipulation thereof; the lower end of each jack being selectively withdrawable from engagement with the associated spring assembly to allow unencumbered operation of said spring assembly.*

*21. In a vehicle including a load bed structure having an underlying load bed frame supported on opposite sides thereof near a bed loading end by a suspension system, said suspension system comprising:*

*leaf springs on each of said frame sides with opposed ends of said springs being positioned beneath and in supporting engagement with the load bed frame;*

*a withdrawable pin under one end of said leaf springs;*

*a wheel assembly associated with each of said leaf springs;*

*means extending across the width of said load bed structure and secured to central portions of said leaf springs for carrying said wheel assemblies;*

*means for selectively elevating the loading end of said load bed structure comprising jack means mounted on each side of said load bed having opposite ends adapted to engage the load bed frame and said wheel assembly carrying means, said jack means being contractable to engage only one of said bed frame and said wheel assembly carrying means during road travel to allow unencumbered operation of said leaf springs and being extendable when the pin under said one spring end is withdrawn to elevate the bed loading end by applying a force between said bed frame and said wheel assembly carrying means tending to separate said bed frame and said wheel assembly carrying means.*

*22. In a vehicle including a load bed structure having an underlying load bed frame supported on opposite sides thereof near a bed loading end by a suspension system, said suspension system comprising:*

*leaf springs on each of said frame sides with opposed ends of said springs being positioned beneath the load bed frame with one end of each spring mounted to allow free swinging movement of the other spring ends upon release of the other spring ends;*

*means for selectively locking said other spring ends for road travel and releasing said other spring ends for allowing the bed loading end to be elevated;*

*a wheel assembly associated with each said leaf springs;*

*means extending across the width of said load bed structure and secured to central portions of said leaf springs for carrying said wheel assemblies; and*

*means for selectively elevating the loading end of said load bed structure comprising jack means mounted by said load bed having opposite ends adapted to engage the load bed frame and said wheel assembly carrying means, said jack means being contractable to engage only one of said load bed frame and said wheel assembly carrying means during road travel to allow unencumbered operation of said leaf springs and being extendable when said other spring ends are released to force a swinging movement of said other spring ends relative to said load bed frame and thereby elevate said bed loading end.*

* * * * *